United States Patent [19]

Matoba

[11] Patent Number: 4,838,123

[45] Date of Patent: Jun. 13, 1989

[54] MOUNTING OF A PLANETARY GEAR ASSEMBLY ON A CASING

[76] Inventor: Hideyasu Matoba, 6-10,, Ajiharahonmachi, Tennoji-ku, Osaka, Japan

[21] Appl. No.: 19,789

[22] Filed: Feb. 27, 1987

[30] Foreign Application Priority Data

Mar. 27, 1986 [JP] Japan ................. 61-69674

[51] Int. Cl.$^4$ .................. F16H 57/00; F16H 1/28
[52] U.S. Cl. ........................... 74/801; 74/411
[58] Field of Search ............ 74/891, 797, 606 R, 74/411

[56] References Cited

U.S. PATENT DOCUMENTS

| | | |
|---|---|---|
| 1,425,430 | 8/1922 | Wikander . |
| 2,657,586 | 11/1953 | Chestley . |
| 2,801,552 | 8/1957 | Stubbings et al. ............ 74/801 |
| 2,964,977 | 12/1960 | Kopec ............ 74/781 |
| 3,293,928 | 12/1966 | Heister ............ 74/64 |
| 3,421,390 | 1/1969 | Lohr ............ 74/801 |
| 3,424,035 | 1/1969 | Heidrich ............ 74/801 |
| 3,548,673 | 12/1970 | Suchocki ............ 74/409 |
| 3,583,252 | 6/1971 | Shipitalo et al. ............ 74/399 |
| 4,503,719 | 3/1985 | Hamano ............ 74/801 X |
| 4,617,839 | 10/1986 | Matoba ............ 74/801 |

FOREIGN PATENT DOCUMENTS

| | | | |
|---|---|---|---|
| 161354 | 4/1954 | Australia | 74/801 |
| 205245 | 8/1956 | Australia | 74/801 |
| 444697 | 5/1927 | Fed. Rep. of Germany . | |
| 59057 | 5/1981 | Japan . | |
| 17244 | 2/1983 | Japan . | |
| 94656 | 6/1983 | Japan . | |
| 30938 | 7/1984 | Japan . | |
| 27320 | 6/1985 | Japan . | |
| 252845 | 12/1985 | Japan . | |
| 260738 | 12/1985 | Japan . | |
| 27337 | 2/1986 | Japan . | |
| 206853 | 9/1986 | Japan . | |

Primary Examiner—Dirk Wright
Attorney, Agent, or Firm—Cushman, Darby & Cushman

[57] ABSTRACT

An outer inner-toothed gear is loosely mounted in a casing. Several coupling arc parts of the outer inner-toothed gear are fitted to coupling projections of the casing with clearances defined therebetween. The outer inner-toothed gear displaces in the radial direction. Radial displacements reduce the noise generation. The outer inner-toothed gear can deform in angular directions. Angular deformations alleviate impulses during reversions and suppress the noise generation.

14 Claims, 8 Drawing Sheets

MOUNTING OF A PLANETARY GEAR ASSEMBLY ON A CASING

BACKGROUND OF THE INVENTION

1. Field of the Invention

This invention relates to a mounting of a planetary gear assembly on a casing.

2. Description of the Prior Art

Planetary gear assemblies have a wide scope of utility as a decelerator or accelerator.

Planetary gear assemblies are able to be used in various manners. In most cases the outer inner-toothed gear is fixed on a casing. Namely, in these cases the outer inner-toothed gear is tightly fixed on the casing by screws parallel with the axis of the gear assembly.

Recently, planetary gear assemblies have increasingly been adapted as reduction devices e.g. for electric washers instead of belt-pully type reduction devices.

Japanese Patent Publication No. 60-27320 (published on June 28, 1985) disclosed a single-tub electric washer having a planetary gear assembly as the reduction device.

Because a planetary gear assembly can be used as an integrated unit, it enables one to simplify the manufacturing process of an electric washer.

In the prior art axially-directed screws tightly fix an outer inner-toothed gear on a casing. Because of the screw-fixation the outer inner-toothed gear is tightly coupled with the casing. Four screws or eight screws may be used in the fixation. However the screw-fixation takes much time. Namely, a worker must coincide the holes bored through the outer inner-toothed gear with the screw holes bored on the casing, insert screws into the coincided holes and revolve turn the screws with a screwdriver.

To simplify this process, more convenient fixation was devised. Several protrusions are formed in the axial direction on a casing, which correspond to the holes of the outer inner-toothed gear. By inserting the protrusions of the casing into the holes of the outer inner-toothed gear and pushing the outer inner-toothed gear by a ring-shaped pressing plate, the outer inner-toothed gear is tightly fixed on the casing.

There is no clearance between the holes of the outer inner-toothed gear and the protrusions of the casing. Thus the outer inner-toothed gear is firmly fixed without backlash. This fixation forbids relative movement between the casing and the outer inner-toothed gear.

However this fixation takes still much time, because a plurality of holes of the outer inner-toothed gear must be fitted on the corresponding protrusions.

In general, reduction gears generate noise from the engagement of gear teeth. Besides electric washers, the reduction gears employed in any machines generate noise more or less.

Of course another parts except the reduction gear also generate noise, because a machine consists of many movable parts.

Planetary gear assemblies have been well known for a long time. However they have hardly been used in practice as reduction devices because of the parctical defects. Because a planetary gear assembly has a high symmetry, its transmission efficiency ought to be high. But it is not always true.

Unlike other gear-train systems, the freedom of gear engagement is very low in a planetary gear assembly, because of the excess engagement points among gears. Small size errors of parts frequently generate the reaction forces which suppress the relative rotation of gears. This fact has been reducing the merit of planetary gear assembly.

Because this difficulty is able to be resolved by raising the precisions of gear-shaping, good planetary gear assemblies have been manufactured by assembling the gears finished carefully without size error.

Accordingly the conventional planetary gear assemblies must be highly expensive. This fact may suppress the pervation of planetary gear assemblies as reduction devices.

Thus it was thought that an outer inner-toothed gear should be tightly fixed on a casing with the least size error. Therefore the fixation by screws, protrusions and holes has been adopted for a long time for mounting a planetary gear assembly in a casing.

This Inventor has previously invented a novel planetary gear assembly which may invert the prevailing common sense (Japanese Patent Application No. 56-193113, Japanese Patent Laying Open No. 58-94656, laid open on June 4, 1983).

The novel planetary gear assembly has a plurality of planetary gears which consist of a ring-shaped gear and two side discs larger than the tooth-edge circle of the gear. The ring-shaped gear is sandwiched by two side discs.

In correspondence with the structure of the planetary gears, the outer inner-toothed gear consists of a gear part and two side inner-cylindrical parts larger than the tooth-root circle of the gear part.

Because the planetary side discs roll on the side inner-cylindrical parts of the outer inner-toothed gear, the radial displacements of the planetary gear are effectively suppressed, which ensures smooth rotations of gears.

The Inventor thinks that the planetary gear assembly is an unprecedented invention which apparently contradicts with the common sense of the field of technology.

The line velocity of gear is defined as a tangential speed on the pitch circle of gear.

A complex gear which has one or two side friction discs has been used from old to prevent an excess engagement of teeth.

The diameter of the side friction discs were equal to that of the pitch circles of the gears without exception. If the diameters of the side discs were different from the pitch circles, two line velocities of the side discs were different. To equalize the line velocities of the two discs, the diameter of the side discs must be equal to that of the pitch circles.

The Inventor has denied the common sense that the side discs must be same with the pitch circles in complex gears.

The novel planetary gear invented by this Inventor has side discs larger than the tooth-edge circle which is still larger than the pitch circle. The planetary gear assembly having the novel planetary gear can rotate despite the difference of the line velocities of the rolling discs. The reason why the gears can rotate will be explained now.

Of course the line velocities of the rolling side discs are different, but the difference is very little. This is one reason.

Little difference of line velocities can be cancelled by widening clearances between the discs and the gear parts, because the wide clearance allows slipping between the side discs and the gear parts. This is another reason.

This Inventor became aware of the two facts.

First the difference $\Delta V$ of the line velocities of two side discs rolling with each other is given by $$\Delta V = \delta \Omega \qquad (1)$$

where $\delta$ is the deviation of the disc surface from the pitch circle and $\Omega$ is the angular velocity of the gear.

The difference $\Delta V$ may be intuitively estimated as $2\delta\Omega$, because both of the rolling discs and inner cylindrical parts deviate by $\delta$ from their pitch circles.

But this is wrong. A brief calculation shows us that the difference is only $\delta\Omega$.

Furthermore if wide clearances are formed between the outer surfaces of the discs and the inner-cylindrical parts, the planetary discs can easily slip against the inner cylindrical parts. The slipping cancels the difference of line velocities.

Besides, another wide clearances between the planetary disc and the planetary ring-shaped gear make the planetary discs slipping against the planetary gear.

The concept of wide clearances sharply contradicts the conventional common sense of planetary gear assembly.

By taking wide clearances between gears, discs and inner cylindrical parts, the demand for precise finishing is able to be alleviated. The planetary gear assembly can be constructed with cheap parts shaped with low precision. The low precision can be compensated by the wide clearances among the parts. Therefore the invention enables us to manufacture planetary gear assemblies at low cost.

By the invention the planetary gear assemblies begin pervading in various purposes. The invention is one of highly significant inventions in the history of planetary gear assemblies.

There are various modes of size errors in a planetary gear assembly. One error mode is the radial deviation of sun gear. Another error mode is the radial deviation of the carrier. These error modes are caused by the errors of radial displacements or angles of planetary shafts.

The degree to determine the precise positions of planetary shafts on a carrier is called "division precision". High division precision would ensure an excellent planetary gear assembly with low noise and high transmission efficiency.

However it is very difficult and expensive to heighten the division precision.

Furthermore an input shaft and an output shaft should be fitted to the sun gear and the carrier. The shafts are sustained by bearings on the casing. In many cases the center of the bearings deviates from the center of the casing.

Therefore there are various size errors of finishing parts, determining positions and assembling parts.

This Inventor thinks the conventional fixation mounting of an outer inner-toothed gear on a casing shall distrub the smooth rotation of gears, increases the tooth-edge interference and generate large noise, because size errors are unable to be cancelled in the case of fixation mounting.

SUMMARY OF THE INVENTION

One purpose of the present invention is to provide a mounting of a planetary gear assembly on a casing with low noise generation.

Another purpose of the present invention is to provide a mounting of a planetary gear assembly on a casing with facile handling.

Therefore this invention proposes a relaxation mounting of an outer inner-toothed gear on a casing instead of the conventional fixation mounting.

The relaxation mounting of this invention is defined by permitting radial displacements and forbiding a relative rotation between the outer inner-toothed gear and the casing.

The relaxation mounting requires neither screws, pins nor screwholes formed in an axial direction.

The characteristic of this invention is the relaxation mounting instead of the fixation mounting.

DETAILED DESCRIPTION OF THE INVENTION

Figure 1:
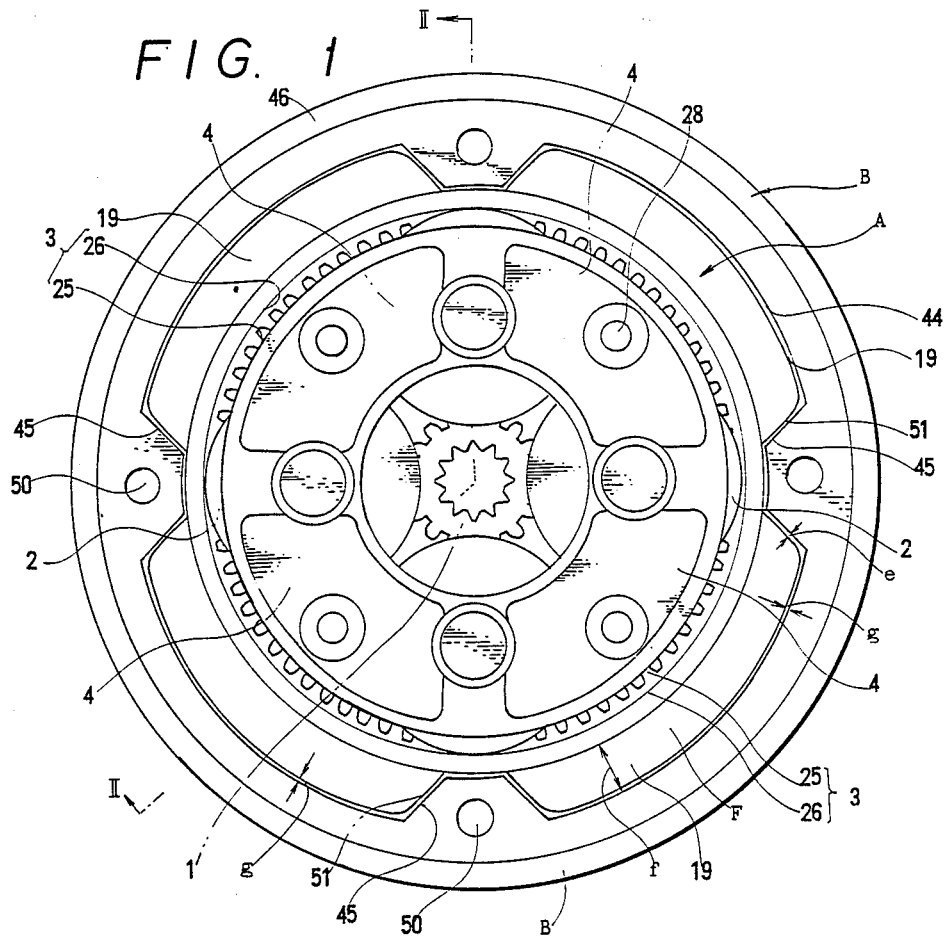
FIG. 1 is a bottom view of a mounting of a planetary gear assembly on a casing according to this invention.

FIG. 1 is a bottom view of a relaxation mounting of a planetary gear assembly (A) on a casing (B). In an electric washer the casing (B) and the gear assembly (A) are installed by positioning the assembly plane parallel with the horizontal plane.

The inner structure of the planetary gear assembly (A) is not important to the understanding of the invention, because this invention does not relate to the planetary gear assembly itself but to the mounting of a gear assembly on a casing.

FIG. 1 shows an example whose planetary gear has two side discs larger than the tooth-edge circle in diameter. This corresponds to Japanese Patent Laying Open No 58-94656.

A sun gear (1) is positioned in the center of the planetary gear assembly. Four planetary gears (2) (or three planetary gears (2)) are disposed symmetrically around the sun gear (1).

Figure 6:
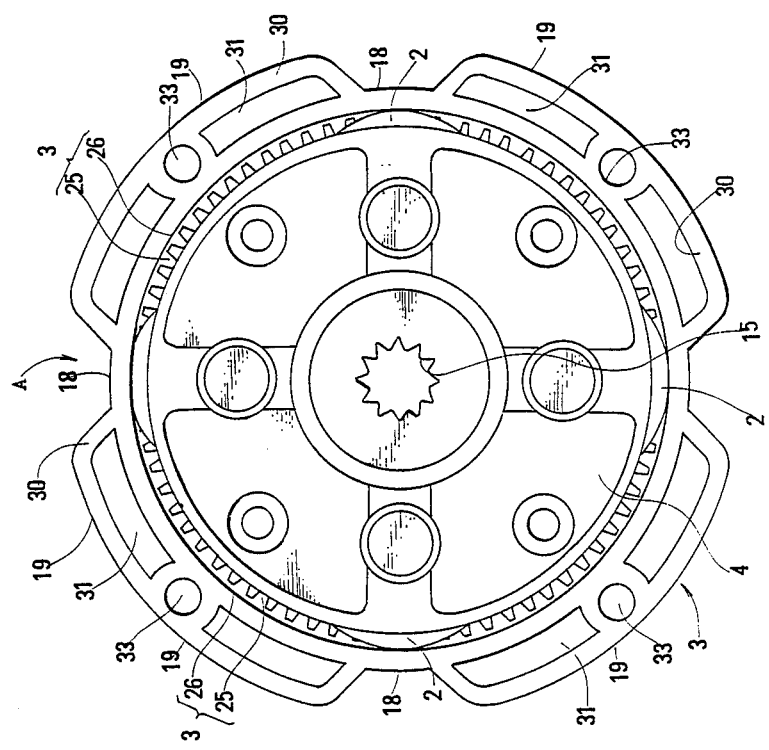
FIG. 6 is a plan view of the planetary gear assembly alone.

The top view of the planetary gear assembly alone is shown in FIG. 6.

The planetary gears (2) are engaged with the sun gear (1). However the tooth edges of the planetary gears (2) do not appear in FIG. 1 or FIG. 6, because the planetary gear has planetary side discs (6) and (7) larger than the tooth-edge circle of the gear and the tooth edges are concealed by the discs (6) and (7).

An outer inner-toothed gear (3) is disposed around the planetary gears (2). Both gears (2) and (3) are engaging with each other. The outer inner-toothed gear (3) plays a role of a housing of the planetary gear assembly.

A carrier (4) consists of a main carrier disc (4a) and a sub-carrier disc (4b). Four (or three) planetary shafts (5) are sustained on both sides at four points on the inner surfaces of the carrier discs (4a) and (4b). The four points are positioned at four-fold-rotational symmetry with regard to the center.

The planetary gears (2) are penetrated and rotatively supported by the planetary shafts (5).

The planetary gear (2) consists of three parts—two equivalent planetary side discs (6), (7), and a planetary gear ring (8) sandwiched by the discs (6) and (7).

The planetary disc (6) or (7) has a large disc part (23) and a small column part (21). The large disc part (23) is larger than the tooth-edge circle of the planetary gear. The small column part (21) contacts the inner surface of the planetary gear ring (8) and supports the ring (8).

The main carrier disc (4a) and the sub-carrier disc (4b) are coupled with each other at four symmetric points which are distanced from the direction of planetary shafts (5) by 45 degrees.

The main carrier disc (4a) has four protrusions (10) and four sockets (11) on the inner surface.

The sub-carrier disc (4b) has four protuberances (12) and four holes (13) correspondingly.

In order to couple the carrier discs (4a) and (4b), the sockets (11) of the main carrier disc (4a) are inserted into the holes (13) of the sub-carrier disc (4b). Then the top ends of the sockets (11) are pressed and widened. The widened top ends (28) atrongly push the sub-carrier disc (4b) against the main carrier disc (4a).

In this example, the carrier (4) is made from aluminium die-casting. Otherwise the carrier is able to be made from zinc, steel or plastics.

In the case of plastic carrier discs, two carrier discs are coupled only by fitting the socket (11) into the hole (13). The elastic force of the plastic parts keeps the coupling state. If the top ends of the sockets are fixed by an adhesive, the coupling is reinforced. The top ends of the sockets may be welded by a supersonic welding machine.

In the case of zinc carrier discs, the carrier discs are easily molded from a zinc melt by a metallic mold.

In the case of steel carrier discs (e.g. Chrome-Molybdenum-steel), simple discs are cut. Then the discs (4a) and (4b) are connected by rivets.

The sun gear (1) and the planetary gears (2) are made from sintered alloy, steel, plastics or zinc.

The outer inner-toothed gear (3) is conveniently made from plastic molding. This is possible, because the side inner-cylindrical parts (26) are larger than the outer gear part (25).

Otherwise the outer inner-toothed gear (3) can be made from alminium die-casting. But in the case of alminium, the shape of the outer inner-toothed gear (3) must be designed to suit to the alminium die-casting.

The outer inner-toothed gear (3) has an outer gear part (25) and two side inner-cylindrical parts (26) and (27) on the inner surface. The inner-cylindrical parts (26) and (27) are larger than the tooth-root circle of the gear part (25) in inner diameter.

The outer gear part (25) is engaging with the planetary gear rings (8). The large disc parts (23) of the planetary discs (6) and (7) are rolling on the inner-cylindrical parts (26) and (27) of the outer inner-toothed gear (3). The large disc parts (23) and the inner-cylindrical parts (26) and (27) deviate from their pitch circles. Thus the line velocities are different. The difference of the line velocities is $\delta\Omega$. $\delta$ is the deviation of the larger disc parts (23) or the inner-cylindrical parts (26) from their pitch circles. $\Omega$ is the relative angular velocity of the planetary gear (2) with regard to carrier (4).

However there are clearances between the planetary gear ring (8) and the planetary discs (6) and (7). And there are clearances between the planetary discs (6) and (7) and the inner-cylindrical parts (26) and (27). Therefore these rolling surfaces are not always contacting with each other. Non-contacting time allows free rotations of the parts.

Accordingly despite the difference of line velocities, the surfaces of the planetary discs (6), (7) and the inner-cylindrical parts (26), (27) do not strongly rub with each other. The clearances cancel the difference of the line velocities. The cancellation is complete except the case of high speed rotation.

Figure 7:
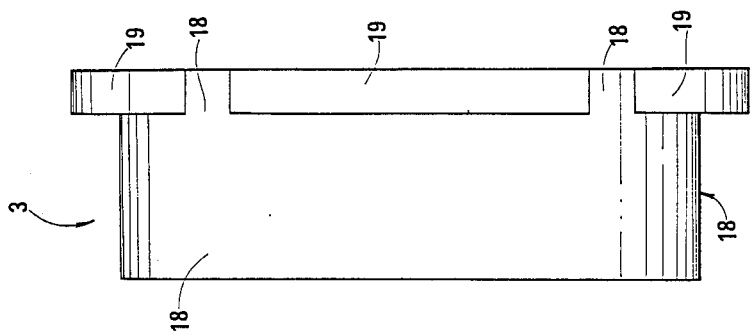
FIG. 7 is a side view of the outer inner-toothed gear alone.

Most part of the outer inner-toothed gear (3) is a smooth cylindrical surface. FIG. 7 shows the side view of the outer inner-toothed gear (3). The smooth outer cylindrical surface (18) occupies most of the external surface. But four coupling arc parts (19) are shaped on one side around the outer inner-toothed gear (3).

The coupling arc parts (19) are not shaped on both sides, nor spanned between both sides. The coupling arc parts (19) are asymmetric with regard to the center plane of the gears (1), (2) and (3).

By the coupling arc parts (19), the outer inner-toothed gear is loosely coupled with the casing (B).

The number of the coupling arc parts (19) is not necessarily four. Two, three of more than five coupling arc parts (19) are also available.

In this example the coupling arc part (19) comprises an external arc rib (30), two arc grooves (31) and a circular cavity (33). These rib structure is designed to spare plastic material without reducing the strength of the coupling arc part (19). However the rib structure is able to be changed arbitrarily.

Figure 3:
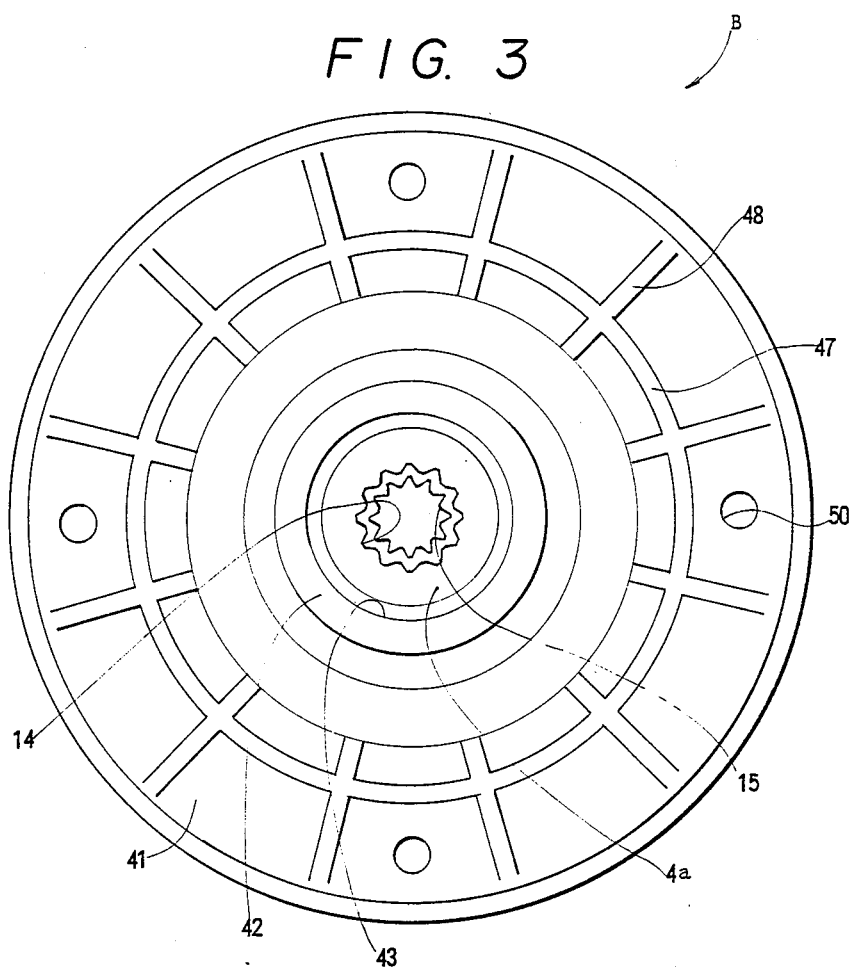
FIG. 3 is a plan view of the same mounting.
Figure 4:
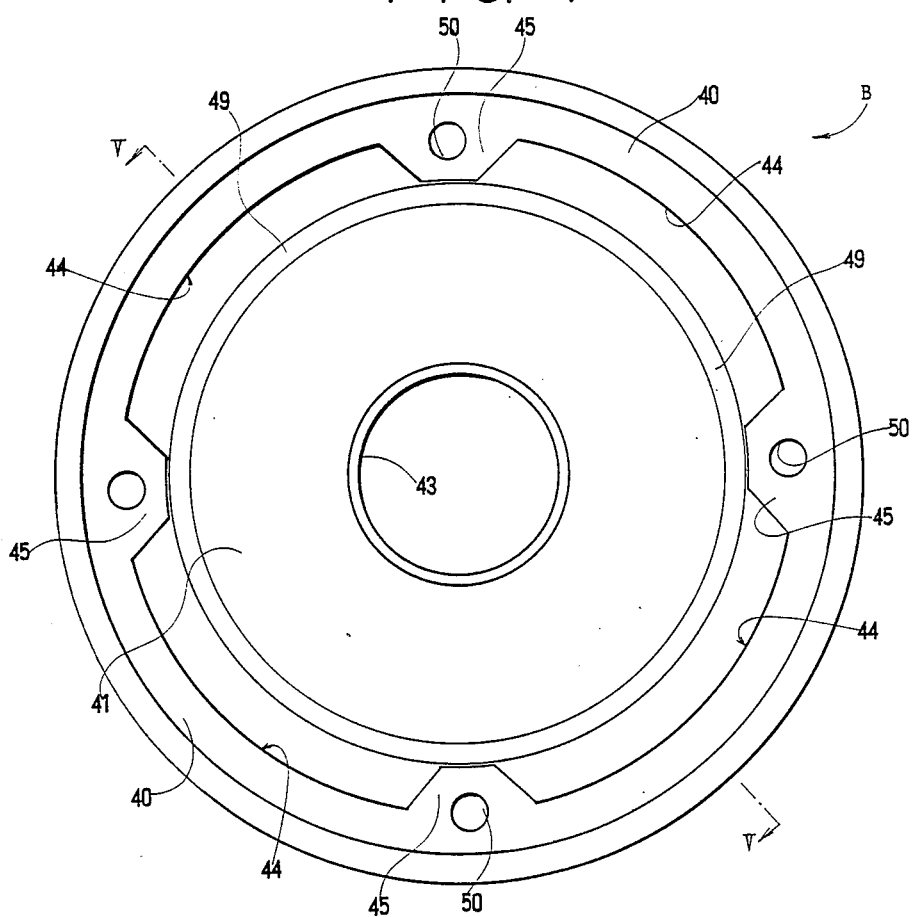
FIG. 4 is a bottom view of the casing alone.
Figure 5:
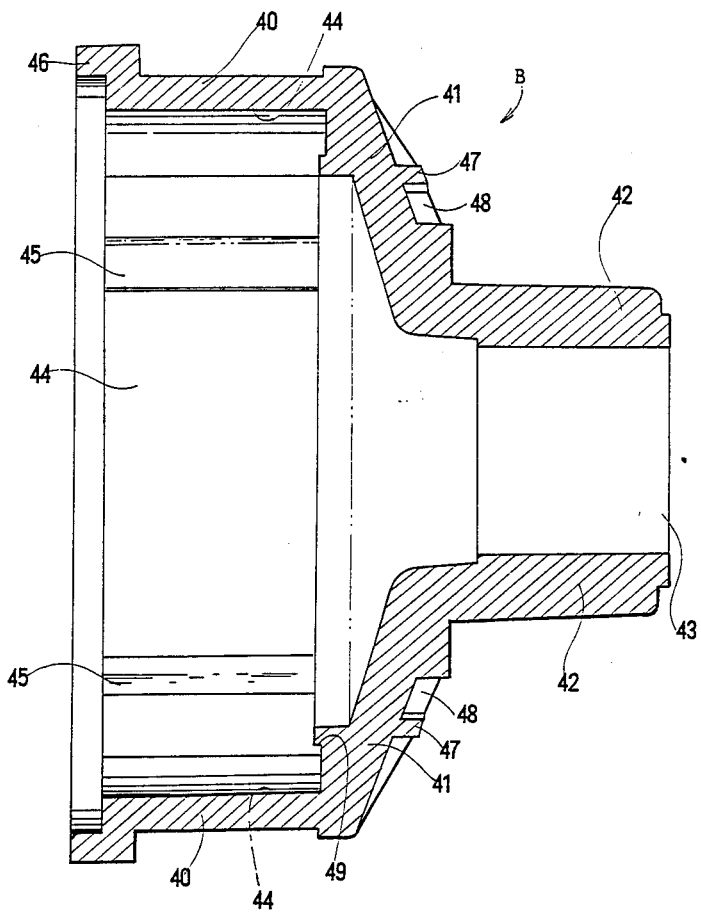
FIG. 5 is a sectional view taken along the line V—V in FIG. 4.

With regard to the casing (B), the top view is shown by FIG. 3 and the bottom view is shown by FIG. 4. FIG. 5 shows the sectional view.

In this example the casing (B) is made from alminium in order to heighten the heat radiation and the mechanical strength. Otherwise the casing (B) can be made from plastics, casting iron, alminium aloy or other metal.

The casing (B) consists of a large drum part (40), a conical part (41) and a small cylindrical part (42). The drum part (40) stores the planetary gear assembly (A). The cylindrical part (42) has an output shaft hole (43) through which an output shaft projects outward.

Most of the inner surface of the drum part (40) is shaped to be smooth round surfaces (44). Four trapezoid coupling projections (45) are formed along the axial direction on the inner surface of the drum part (40).

The coupling projections (45) of the casing (B) are complements to the coupling arc parts (19) of the outer inner-toothed gear.

When the planetary gear assembly (A) is mounted on the casing (B), the coupling arc parts (19) are inserted into the smooth round surfaces (44) of the drum part (40).

The smooth outer cylindrical surfaces (18) contact with the coupling projections (45).

On the external surface of the conical part (41), a circular rib (47) and radial ribs (48) are formed for reinforcing the casing (B).

A flange (46) is formed at the forefront of the drum part (40). A cover plate (not shown) shall be fitted on the flange and be fixed by bolts (not shown) inserted through fixation holes (50).

In a mounting state, there are clearances (g) between the coupling arc parts (19) of the outer inner-toothed gear (3) and the smooth round surfaces (44) of the casing (B).

For example, the outer diameter of the coupling arc parts (19) is 75 mm, and the inner diameter of the smooth round surfaces (44) is 76 mm. In the example, the clearance (g) is 0.5 mm in radius or 1 mm in diameter. The clearance (g) takes an arbitrary value between 0 and 1 mm.

In general, appropriate valve of clearance (g) is 0.5 mm to 3 mm.

Furthermore there are clearances (e) between the coupling projections (45) and the slant edges (51) of the coupling arc parts.

Then there are wide spaces (F) between the smooth outer cylindrical surface (18) of the outer inner-toothed gear (3) and smooth round surface (44) of the casing (B). The width is denoted by (f).

The functions of the mounting of this invention will now be explained.

An input shaft (not shown in figures) is fitted in the sun shaft hole (14). An output shaft (not shown in figures) is fitted in the carrier shaft hole (15). Splines or serrations are shaped on the shafts and the shaft holes to couple with each other.

In the mounting state, a cover plate (not shown) is fitted on the flange (46) and is fixed by bolts to the casing (B).

When the input shaft rotates, the output shaft also rotates in a reduced speed, because the planetary gear assembly acts as a reduction device.

However the outer inner-toothed gear can displace in the radial directions, because it is not fixed but loosely mounted in the casing.

"$g_m$" denotes the maximum value of (g). Then the clearance (g) between the casing and the outer inner-toothed gear can take an arbitrary value between 0 and $g_m$.

Perphaps the output shaft and the input shaft may be eccentric a little, that is, the centers of the shafts may deviate from the centers of the casing (B) and the planetary gear assembly (A).

Further the division error of the planetary shafts may occur. These size errors would cause resistance forces against the rotations of gears, if the outer inner-toothed gear was tightly fixed and very narrow clearances were given at the contact points of the parts.

However the wide clearances enable the gears (1), (2) and (3) to displace in the radial directions. Thus the radial displacements of the gears equalize the forces acting on the points. The dynamical balance of the forces reduces the resistance forces caused by the size errors.

Therefore even if the planetary gear assembly itself is finished with low precision, the gears (1), (2), (3) and the carrier (4) are able to rotate without resistance. Smooth rotations of gears lead to high transmission efficiency.

Furthermore this relaxation mounting allows random radial displacements of the gears (1), (2) (3) and the carrier (4). The radial displacements equalize all forces acting on arbitrary points and reduce the noise generation. Low noise is the most important advantage of this relaxation mounting.

Vibrations with various frequencies and amplitudes occur on the contacting points of teeth. However the vibrations with high frequencies are not transmitted to the casing (B), because the casing (B) is not tightly mounted to the outer inner-toothed gear (3).

Regarding the vibrations with low frequencies, the vibrations whose amplitudes are less than the clearance (g) are not transmitted to the casing (B) also. The vibrations with small amplitudes are absorbed by the clearance (g).

Most of external part (smooth outer cylindrical part (18)) of the outer inner-toothed gear (3) is distanced from the casing (B) by the width (f). The narrow side parts (coupling arc parts (19)) of the outer inner-toothed gear (3) contact the casing (B). Then the outer inner-toothed gear (3) can freely deform elastically. There are two modes of deformations.

Elastic deformation of the outer inner-toothed gear (3) happens in the radial directions and in the angular directions. The radial deformations signify the repetitions of dilation and shrinkage of the smooth outer cylindrical surface (18). Because of the clearances (g) and (e), the outer inner-toothed gear deforms toward an ellipsoid or toward a square.

Another mode of deformation is the twist of the cylindrical surface (18), namely the deformation of angular directions. This mode of deformation is caused by forming the coupling arc parts (19) only on the side of the outer inner-toothed gear.

Figure 2:
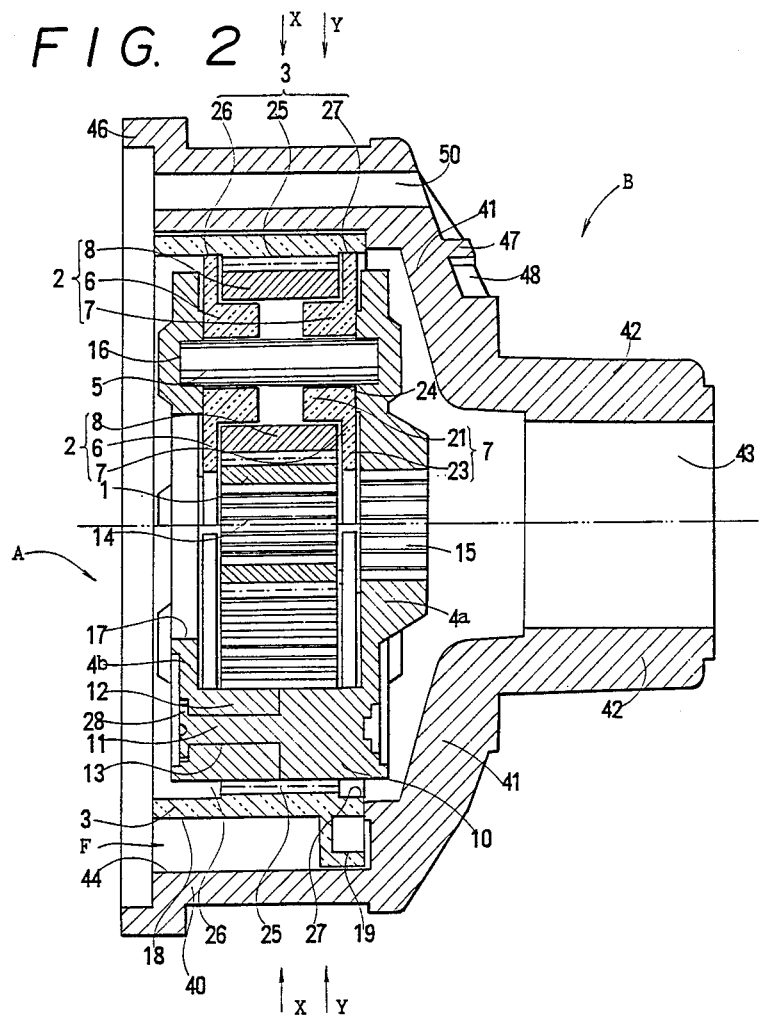
FIG. 2 is a sectional view taken along the line II—II in FIG. 1.

The center of the rotation forces acting to the outer inner-toothed gear (3) from the planetary gears (2) coincides on the center line of the outer gear part (25). The line X—X denotes the center of the rotation forces in FIG. 2.

However the rotation forces are transmitted to the casing (B) by the side coupling arc parts (19). Then the center of the forces to the casing (B) coincides the working line Y—Y in FIG. 2.

The line X—X or the plane X differs from the line Y—Y or the plane Y. The torque acting on the plane X is balanced with the torque acting on the plane Y. But a twisting torque exists between the plane X and the plane Y. The twisting torque twists the outer cylindrical surface (18) or the outer inner-toothed gear (3).

If the gears rotate clockwise and counterclockwise in turn like the reduction gears in electric washers, the twisting deformations alleviate the impulses occurring at the moment of reversion. Because the impulses are reduced, the noise generation is reduced also.

The probable elastic deformation is another advantage of the invention.

This invention relates only to the mounting of a planetary gear assembly on a casing. The inner structures of the planetary gear assembly are arbitrary. Any variations are available with regard to planetary gear assemblies.

Figure 8:
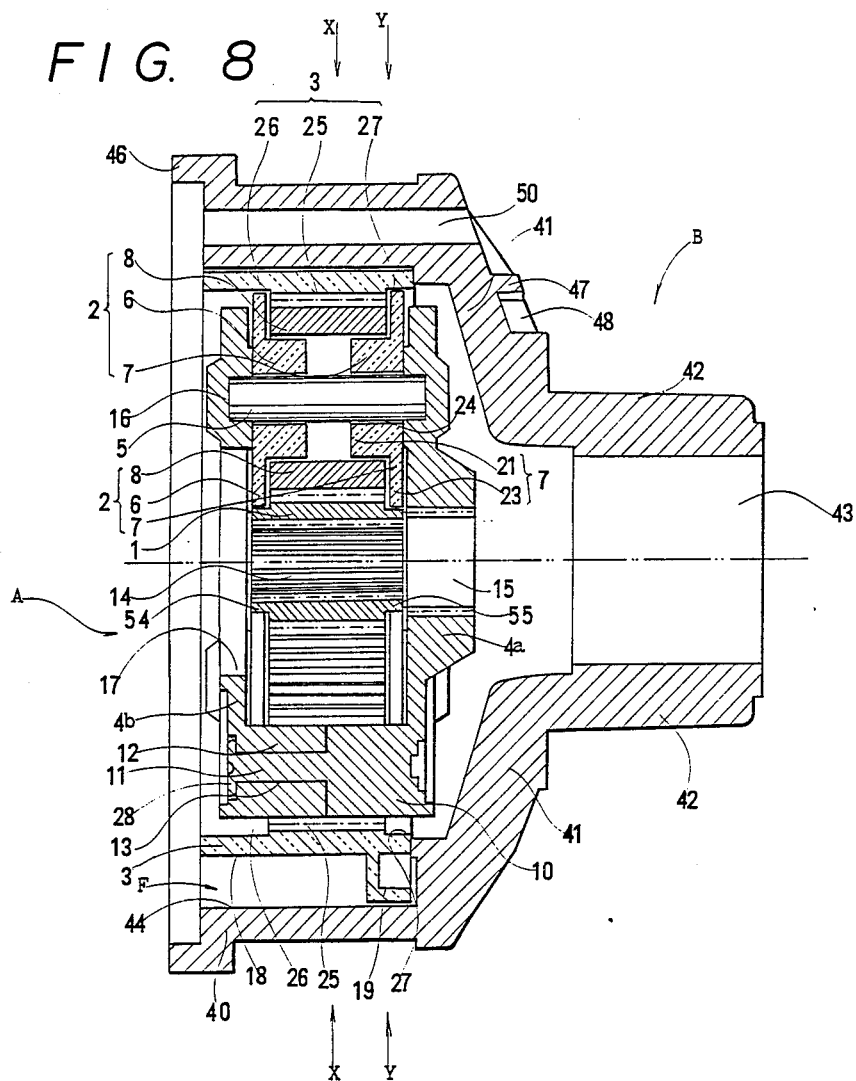
FIG. 8 is a sectional view of a mounting of another planetary gear assembly on a casing according to this invention.

FIG. 8 shows another structure of planetary gear assembly. A sun gear (1) has two side cylindrical bosses (54) and (55) whose diameter is smaller than the tooth-root circle of the sun gear (1). The side cylindrical bosses (54) and (55) contact and roll upon the planetary discs (6) and (7). This planetary gear assembly has been disclosed by Japanese Patent Laying Open No. 60-201146 (laid open on Oct. 11, 1985).

Figure 9:
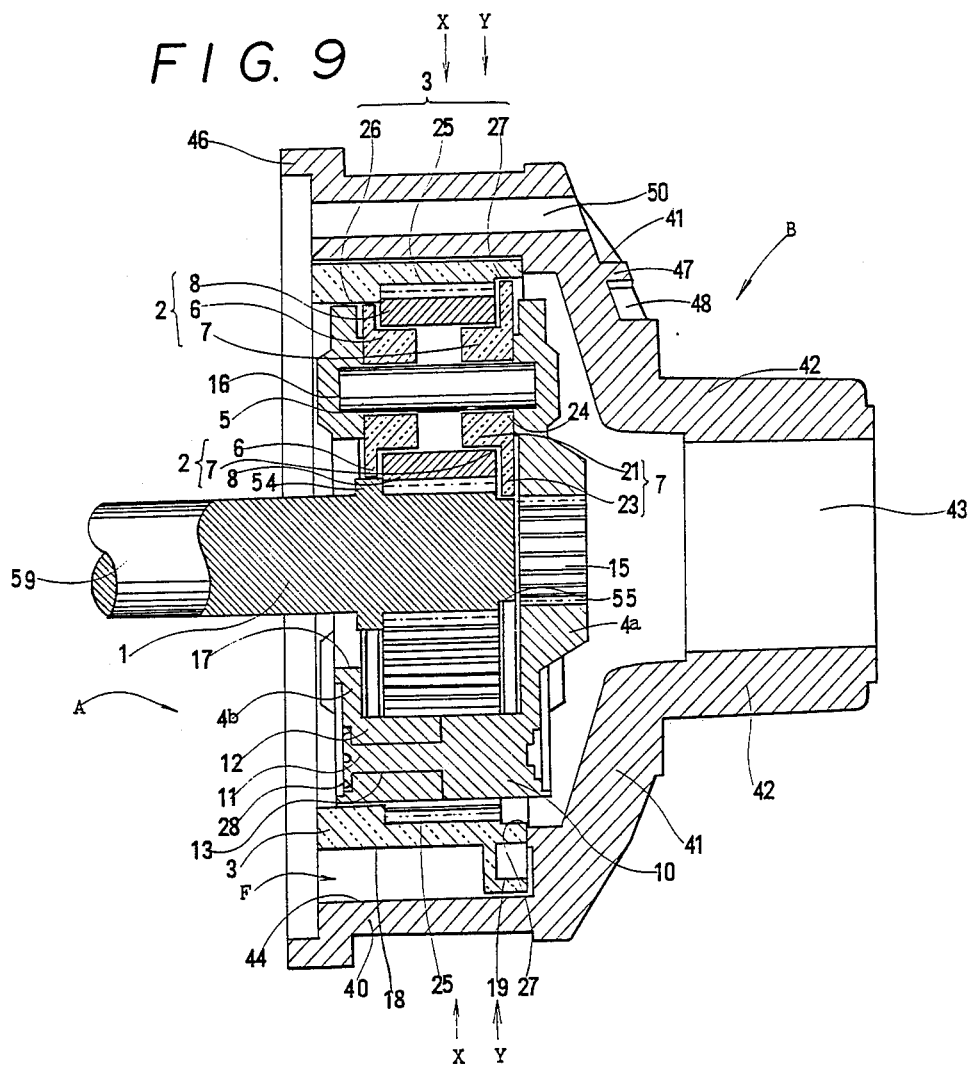
FIG. 9 is a sectional view of a mounting of other planetary gear assembly on a casing according to this invention.

FIG. 9 shows other structure of an asymmetric planetary gear assembly. A planetary disc (6) is smaller than the tooth-root circle. Another planetary disc (7) is larger than the tooth-edge circle.

One inner-cylindrical part (26) of the outer inner-toothed gear (3) is smaller than the tooth-edge circle. Another inner-cylindrical part (27) is larger than the tooth-root circle.

A sun gear (1) is formed in a body with a sun shaft (59). Furthermore a larger sun column (54) and a smaller sun column (55) are shaped on both sides of the sun gear (1). The larger sun column (54) is larger than the tooth-edge circle. The smaller sun column (55) is smaller than the tooth-root circle.

The smaller sun column (55) rolls on the larger planetary discs (7). The larger sun column (54) rolls on the smaller planetary discs (6).

The larger planetary discs (7) roll on the larger inner-cylindrical part (27). The smaller planetary discs (6) roll on the smaller inner-cylindrical part (26).

This asymmetric planetary gear assembly has disclosed by Japanese patent laying Open No. 61-27337 (laid open on Feb. 6, 1986). An advantage of the asymmetric planetary gear assembly is the possibility of inserting and plucking of the sun shaft after the whole gear assembly has constructed.

The advantages of the invention are now explained.

(1) Because the outer inner-toothed gear is mounted on the casing in a relaxation mounting, the outer inner-toothed gear is able to displace in the radial directions. The radial displacements of the outer inner-toothed gear absorb various modes of size errors and keep smooth rotations of gears. Thus the radial displacements effectively suppress the noise generation.

(2) The clearances (e), (g) and (f) between the casing (B) and the outer inner-toothed gear attenuate the transmissions of vibrations to the casing. Thus the noise generation is suppressed also by the clearances.

(3) The outer inner-toothed gear can deform elastically. The elastic deformation raises the transmission efficiency and reduces the noise generation.

(4) In case of electric washers, the Inventor has measured the noise generations. One electric washer is equipped with a planetary gear assembly fitted in the relaxation mounting according to this invention. Another electric washer is equipped with a planetary gear assembly fitted in the fixation mounting fixed by screws. Maximum weight (4.2 kg in the example) of clothes were washed by the washers.

The input rotation speed was 820 to 900 RPM (revolutions per minute). The reduction rate of the planetary gear assembly was 1/4.8. A belt-pulley reduction device reduced the motor rotation (1800 to 2000 RPM) to the input rotation (820 to 900 RPM).

The noise strengths were measured at a spot distanced from the electric washer by 1 m. The noise strength from the washer of the relaxation mounting was 48 phons. The noise strength from the washer of the fixation mounting was 55 phons. Many parts other than the reduction gears also generate noise. This reduction of noise strength shows an excellent advantage of this invention.

(5) Besides electric washers, the mounting of this invention can be adopted in reduction devices in arbitrary machines.

What is claimed is:

1. Mounting for a planetary gear assembly of the type having a casing, a sun gear, a plurality of planetary gears and an outer inner-toothed gear within said casing, comprising:
a plurality of coupling projections formed on the inner surface of the casing, coupling arc parts formed on one side of the external surface of the outer inner-toothed gear and loosely fitted to said coupling projections, the coupling projections and casing being formed so that a clearance exists between the coupling arc parts and a round surface of the casing for permitting radial displacement of the outer inner-tooth gear with respect to the casing, the coupling arc parts further having slant edges which are formed to engage the coupling projections with a clearance defined therebetween for permitting angular displacement, the outer coupling arc parts also acting to distance an outer cylindrical surface of the outer inner-toothed gear from the round surface of the casing by a relatively wide space whereby vibration between the outer inner-toothed gear and the casing is attenuated.

2. Mounting of a planetary gear assembly on a casing as claimed in claim 1, wherein a center line of an outer gear part of the outer inner-toothed gear deviates in an axial direction from a center line Y—Y the coupling arc parts for transmitting rotational forces to the casing.

3. Mounting of a planetary gear assembly on a casing as claimed in claim 2, wherein the outer inner-toothed gear is made from plastics.

4. Mounting of a planetary gear assembly on a casing as claimed in claim 2, wherein the outer inner-toothed gear is made from aluminum die-casting.

5. Mounting of a planetary gear assembly on a casing as claimed in claim 3, wherein the outer inner-toothed gear is formed to deform elastically in radial directions.

6. Mounting of a planetary gear assembly on a casing as claimed in claim 5, wherein the outer inner-toothed gear deforms elastically toward an elipsoid.

7. Mounting of a planetary gear assembly on a casing as claimed in claim 5, wherein the outer inner-toothed gear deforms elastically toward a square.

8. Mounting of a planetary gear assembly on a casing as claimed in claim 3, wherein the outer inner-toothed gear is formed to twist elastically in angular directions.

9. Mounting of a planetary gear assembly on a casing as claimed in claim 1, wherein the clearance between the coupling arc part and the round surface of the casing is 0.5 mm to 3 mm in diameter.

10. Mounting of a planetary gear assembly on a casing as claimed in claim 1, wherein the planetary gear consists of a planetary gear ring and two side planetary discs with large disc parts larger than the tooth-root circle, and the outer inner-toothed gear comprises an outer gear part and side inner-cylindrical parts and rolling upon the large disc parts of the planetary discs.

11. Mounting of a planetary gear assembly on a casing as claimed in claim 10, wherein the sun gear has side cylindrical bosses and rolling on the large disc parts of the planetary discs.

12. Mounting of a planetary gear assembly on a casing as claimed in claim 1, wherein the planetary gear consists of a planetary gear ring, a large side planetary disc and a smaller side planetary disc, the outer inner-toothed gear comprises an outer gear part, a larger side inner-cylindrical part and a smaller side inner-cylindrical part, and the sun gear has a smaller column and a larger column.

13. Mounting of a planetary gear assembly on a casing as claimed in claim 12, wherein the sun gear is shaped in a body with a sun shaft.

14. A vibration reducing mounting for a planetary gear assembly of the type which has a central sun gear, a plurality of planetary gears and an outer inner-toothed gear mounted within a casing, comprising:
- a plurality of coupling projections formed on an arcuate inner surface of the casing to extend in a radially inward direction, said coupling projections having slanted end portions;
- a plurality of coupling arc portions formed on an outer surface of the inner-toothed gear to extend in a radially outward direction, said coupling arc portions having slanted side portions which are complementary in shape to said slanted end portions of said coupling projections, said coupling arc portions having outer surfaces which are complementary in shape to said arcuate inner surface of the casing, said arc portions being sized with respect to said projections so that clearances exist between said side and end portions, and between said outer surfaces and said arcuate inner surface, so that radial displacement of the inner-toothed gear is permitted with respect to the casing, whereby vibration therebetween is attenuated.

* * * * *